(12) United States Patent
Lazarev

(10) Patent No.: US 7,053,970 B2
(45) Date of Patent: May 30, 2006

(54) LIQUID CRYSTAL DISPLAY AND THE METHOD OF ITS FABRICATION

(75) Inventor: Pavel I. Lazarev, Belmont, CA (US)

(73) Assignee: Nitto Denko Corporation, Osaka (JP)

( * ) Notice: Subject to any disclaimer, the term of this patent is extended or adjusted under 35 U.S.C. 154(b) by 23 days.

(21) Appl. No.: 10/483,456

(22) PCT Filed: Jul. 26, 2002

(86) PCT No.: PCT/US02/23929

§ 371 (c)(1),
(2), (4) Date: Jun. 25, 2004

(87) PCT Pub. No.: WO03/010594

PCT Pub. Date: Feb. 6, 2003

(65) Prior Publication Data

US 2004/0233351 A1 Nov. 25, 2004

(30) Foreign Application Priority Data

Jul. 26, 2001 (RU) .............................. 2001120831

(51) Int. Cl.
*G02F 1/1335* (2006.01)
(52) U.S. Cl. ....................................................... 349/96
(58) Field of Classification Search .................. 349/96
See application file for complete search history.

(56) References Cited

U.S. PATENT DOCUMENTS 5,007,942 A 4/1991 Claussen et al.
5,739,296 A 4/1998 Gvon et al.
6,198,051 B1 3/2001 Moshrefzadeh et al.
6,805,445 B1 * 10/2004 Silverstein et al. ......... 349/117
2004/0105049 A1 * 6/2004 Yeh et al. ..................... 349/96

FOREIGN PATENT DOCUMENTS

WO WO 97/39380 10/1997

OTHER PUBLICATIONS

Vistin, L.K., "Up-to-date Application of a Liquid Crystal", *Magazine of Mendeleev*, All-Union Chemical Society, vol. 4511, No. 2 (1983), abstract and pp. 141-148.

* cited by examiner

*Primary Examiner*—James A. Dudek
(74) *Attorney, Agent, or Firm*—Dorsey & Whitney LLP

(57) ABSTRACT

The invention pertains to devices for presenting information, in particular liquid crystal (LC) displays and may be used in indicatory technology of various purposes. Liquid crystal display, according to the invention, comprises a layer of liquid crystal, situated between two plates, on each of which there have been placed or formed electrodes and at least one polarizer layer, while the electrodes on at least one of the plates are made transparent, and at least one layer of at least one polarizer formed on the inner side of the transparent electrodes on at least one of the plates in the display is the E-type polarizer and made out of at least partially crystalline film of molecularly ordered structure of an organic dye. Situated above the transparent electrodes, local areas of at least one layer of E-type polarizer, formed on the inner side of the transparent electrodes, are modified to enhance their conductivity.

18 Claims, 1 Drawing Sheet

# LIQUID CRYSTAL DISPLAY AND THE METHOD OF ITS FABRICATION

FIELD OF THE INVENTION

The invention pertains to devices for displaying information, in particular liquid crystal (LC) displays, and may be used in indicatory technology of various purposes.

BACKGROUND OF THE INVENTION

There are known displays implemented in the form of a flat cuvette formed by two parallel glass plates, the inner sides of which feature electrodes, made of optically transparent conducting material, and orienting layers. After assembling the cuvette it is filled with liquid crystal, which forms a layer 5–20 μm thick and acts as the active medium, changing its optical properties (the angle of rotation of the polarization plane) under the influence of an electric field. The change of optical properties is registered in the crossed polarizers, which are usually glued onto the outer surfaces of the cuvette. Therein, areas of the display where electrodes are not under the voltage will transmit light and look bright, whereas the areas under voltage will look dark [L. K. Vistin. JVHO, 1983, vol. XXVII, ed.2, pp.141–148].

The major drawbacks of the mentioned displays are the limited speed, low contrast of imaging and small observation angle, since the multilayer design of the LC-display is effectively governed by the flow of light propagating within the limited solid angle relative to normal to the surface of the display.

As polarizers in such displays one usually uses polarizers based on uniaxially stretched polymer film (for example, polyvinyl alcohol) dyed with iodine vapors or an organic dye [U.S. Pat. No. 5,007,942]. Polarizing effectiveness of such films is determined by the concentration of iodine or other dye in the polymer film and the degree of orderliness of the polymer chains.

Such films possess the so-called positive dielectric anisotropy and positive dichroism. This means that the dipole moments of the optical transition of molecules responsible for absorption of light are oriented along the direction of stretching. Therein, the ellipses of angular dependence of the real and imaginary parts of the refraction index have elongated (needle-like) form. Polarizers obtained from the said films represent polarizers of the O-type, since they transmit the ordinary wave, while absorbing the extraordinary one.

Despite the high polarizing effectiveness of polarizers obtained from the said materials, they feature significant drawbacks, some of which are their light and thermal stability, the necessity to fabricate films of significant thickness in order to provide the high effectiveness. One of the major drawbacks is the fact that two cross oriented polarizers have significant transmission of light incident at an angle to the surface of the polarizer, especially in the directions azimuth of which is ±45° relative to the axis of polarization.

There is a known LC-display with internal polarizers [RU 2120651]. As polarizers in this LC-display one uses thin crystalline films of molecularly ordered structure of organic compounds—dyes [U.S. Pat. No. 5,739,296]. The flat molecules of dyes are grouped into aligned clusters—supramolecular complexes. The planes of molecules and the laying in them dipole moments of optical transition are oriented perpendicularly to the axis of macroscopic orientation of the obtained film. In order to create such structure, one uses the liquid crystal state of the dye, where molecules already posses local orderliness, while being in the one- or two-dimensional quasi-crystalline aggregates oriented relative to each other. When depositing such system onto the substrate and simultaneously applying external orienting influence, this film assumes macroscopic orientation, which in the process of drying the solution, not only remains intact, but may also enhance due to crystallization effect. The axis of polarization, then, is directed along the orienting influence, coinciding with the direction of deposition of the polarizer. In this case, ellipses of angular dependence of the real and the imaginary parts of the refraction index have disk-like shape.

These polarizers represent the E-type polarizers, since they transmit the extraordinary wave while absorbing the ordinary one. The said polarizers feature good angular characteristics, they are light- and thermally stable, they are applicable for forming structures of displays according to the thin-film technology, due to which they appear to be promising in the display technology.

Since in the recent time the main objective in fabrication is miniaturization of devices, the starting point task in fabricating the above displays is the issue of decreasing dimensions of the separate parts of the device as well as the concomitant functional elements, ensuring their functionality. The above polarizers and other anisotropic films based on them are widely utilized in portable displays of various purposes. One of the major challenges arising in fabrication of miniature displays is the decrease of size of their power supplies, which instigates decreasing power consumption and increasing effectiveness of using the governing electric field in the display. Losses of power are due to the low conductivity of the transparent electrodes as well as the voltage drop across the intermediate layers between electrodes and the layer of liquid crystal.

There are various known ways of increasing conductivity of the transparent electrodes, which are usually made of indium-tin oxides, featuring insufficient conductivity. Thus, they may be annealed at about 250° C. [U.S. Pat. No. 6,198,051]. It is also possible to create an auxiliary electrode structure, which is made of highly conductive materials, either on a part of the surface of the transparent electrodes in the form of solid lines or on the entire surface of electrodes in the form of cellular coating [U.S. Pat. No. 6,198,051].

SUMMARY OF THE INVENTION

The technical result of the present invention is development of the design and method of fabrication of liquid crystal displays with inner polarizers, which features low power consumption, while maintaining high operational characteristics, thinness, manufacturability and simplicity of design.

In order to achieve the mentioned technical result, the LC-display contains a layer of liquid crystal, placed between the two plates, each of which features electrodes and at least one layer of polarizer, wherein the polarizer on at least one of the plates represents the E-type polarizer and it has been deposited on the inner side of the transparent electrodes. The E-type polarizer is fabricated out of at least partially crystalline film of molecularly ordered structure of an organic dye, while the areas of the E-type polarizer located above the transparent electrodes have been modified in order to provide an increase of their conductivity.

As the organic material in the E-type polarizer one may use at least one organic material, chemical formula of which contains at least one ionogenic group, which provides its solubility in polar or non-polar solvents in order to form lyotropic liquid crystal phase, and at least one anti-ion. This may be any organic dye, which or derivatives of which are capable of forming stable lyotropic liquid crystal phase. These dyes are used in fabricating optically anisotropic films, including polarizing coatings [4]. Such dyes, for example, are indanthrone (Vat Blue 4), dibenzoimidazole 1,4,5,8-naphthalenetetracarboxilic acid (Vat Red 14), dibenzoimidazole 3,4,9,10-perylentetracarboxilic acid, quinacridone (Pigment Violet 19) and others, as well as their mixtures.

The said organic dyes are capable of absorbing in at least one of the following spectral ranges from 200 to 400 nm, from 400 to 700 nm and from 0.7 to 13 µm.

Local areas of the E-type polarizer may be modified via its impregnation with atoms of at least one material providing increase of conductivity of the local areas of the polarizer. This material can be silver, and/or aluminum, and/or nickel and/or other conducting material.

The display may additionally contain at least one layer aligning the liquid crystal, and/or at least one diffuse reflecting layer, and/or at least one phase-shifting layer, and/or at least one birefringent layer, and/or at least one conducting layer, and/or at least one protective layer, and/or at least one isotropic and/or anisotropic layer, and/or at least one insulating layer, and/or at least one planarising layer, and/or diffuse or mirror reflecting layer, and/or at least one layer simultaneously functioning as at least two of the said layers.

The layer of the E-type polarizer may simultaneously serve as the phase-shifting layer, and/or birefringent layer, and/or the layer aligning the liquid crystal, and/or protective layer, and/or a layer simultaneously functioning as any combination of at least two of the said layers.

Each of the transparent electrodes may have metallic auxiliary structure, implemented on a part of electrode's surface to increase their conductivity.

It is preferred to choose optical thickness of layers in the display such that it would provide an interference maximum at the exit of the display.

The method of fabricating the above described liquid crystal display comprises fabricating the plates of the display with electrodes and polarizers, fastening the plates while forming a cavity for the liquid crystal via using spacers, filling the cavity with liquid crystal and sealing it, while the surface of the transparent electrodes fabricated on the inner surface of at least one of the plates is coated with at least one layer of E-type polarizer made of at least partially crystalline oriented film of an organic dye, after which the coating is impregnated with metal ions in the areas above the electrodes so as to increase conductivity of the film in those local areas.

Impregnation of metal ions into the local areas of the film may be performed electrochemically in solution of an electrolyte containing ions of the metal to be impregnated. The transparent electrodes, then, play the function of the cathode, while anode may be any electrode with catalytic coating, for example platinum. Concentration of solution and parameters of electrochemical processing are chosen such as to implant metal ions without decreasing degree of anisotropy of the polarizer. If aqueous solution of the electrolyte is used, the polarizer has to be converted into its water-insoluble form prior to being processed. For which purpose, the polarizer film is processed with solution of salts of two- and three-valence metals, for example barium chloride. The structure and optical parameters of the polarizer in this process are not altered.

To impregnate local areas of the polarizer film with atoms of a material, which would increase conductivity of these areas, one may use ionic implantation, controlling the concentration of implanted admixture by controlling the dose of implantation, and controlling the depth of penetration—by the energy and the type of implanting ions.

Ionic implantation may be performed in a reactor with an additional electrode, on which the work piece is mounted.

After forming the electrodes, the inter-electrode space is usually leveled by the planarizing layer of a dielectric.

Initially, the polarizing film of E-type is fabricated via deposition of liquid crystal solution of at least one organic dye with simultaneous and/or subsequent orienting influence and removal of the solvent Fabrication of the display according to the disclosed invention includes additional fabrication of at least one layer aligning the liquid crystal, and/or at least one diffuse reflective layer, and/or at least one phase-shifting layer, and/or at least one birefringent layer, and/or at least one conducting layer, and/or at least one protective layer, and/or at least one isotropic and/or anisotropic layer, and/or at least one insulating layer, and/or at least one planarizing layer, and/or one diffuse or mirror reflecting layer, and/or at least one layer simultaneously performing functions of at least two of the said layers.

BRIEF DESCRIPTION OF THE DRAWINGS

The invention will be more clearly understood from the following detailed description when read in conjunction with the accompanying drawings in which.

DETAILED DESCRIPTION OF THE PRESENT INVENTION

Figure 1:
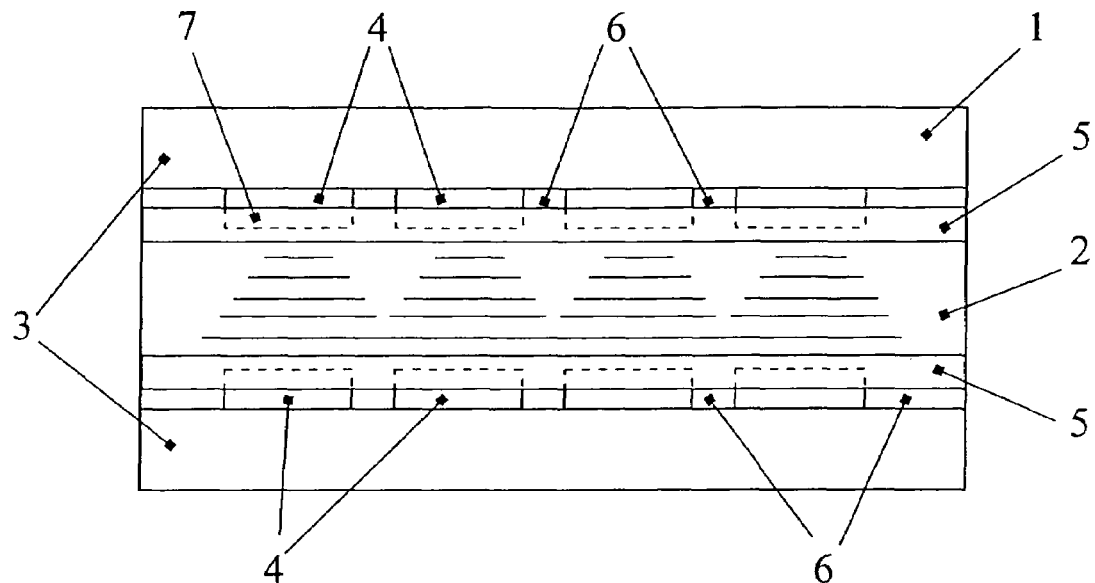
FIG. 1 is a diagram of the display structure. The figure itemizes only those elements, which are, in one way or another, required for implementation of improvements introduced by the invention. Elements of the display, which are usually present in a regular liquid crystal display, but are not relevant to the present disclosure, are not shown in the figure for the sake of simplicity.

Liquid crystal display 1 comprises the layer of liquid crystal 2, placed in between the two plates 3, on each of which there are electrodes 4 and polarizers 5. Under the layer of the polarizer, in the inter-electrode space on the display's plate there are regions of the planarizing insulating layer 6. The particular quality of the display is the fact that at least one of the polarizers is the inner polarizer and is placed over the electrode system. The said polarizer is fabricated from an organic dye, and represents the E-type polarizer. To make this polarizer, liquid crystal solution of the appropriate organic dye (or a mixture of dyes) is deposited onto the underlying structure (plates with electrodes and planarizing layer).

The dye in the liquid crystal solution exists in a highly ordered state. Structural units of such liquid crystal solutions are the highly organized clusters of molecules—supramolecular complexes, where the flat molecules of the organic dye (or the flat parts of those molecules) form "stacks". Mechanical alignment of liquid crystal solution of a dichroic organic material on the surface of the substrate (structure) onsets orientation of the molecular clusters along the direction of the aligning action, such that the planes of molecules appear primarily perpendicular to the direction of alignment. This facilitates crystallization of the dye's molecules in the process of subsequent evaporation of the solvent from the LC layer. Therein, the structural units of the crystal lattice become the individual molecules of the dye and not the linear clusters, which "disappear" during crystallization. As a result, the crystal lattice is porous, for penetration by the metal ions.

The degree of perfection of the crystal structure in the film can be tailored by controlling fabrication conditions and the rate of extraction of the solvent during drying. The described fabrication process is used to create optically anisotropic films. Impregnation of metal ions into these films allows increasing their conductivity without destroying crystal lattice and the degree of anisotropy. Moreover, impregnating the layer of the internal polarizer with atoms of conducting elements in the local areas 7 situated above the electrodes, allows significantly decreasing the voltage drop across the polarizer in an operating display. Creating these local modified regions allows decreasing voltage drop down to 0.1V across polarizers that are 1 μm thick.

Furthermore, the said regions may be obtained via various existing methods. The main requirement to the implantation process is that the film should remain optically anisotropic and maintain its purpose—it should remain a polarizer.

Creating local modified regions is possible by using a lithographic mask, which is usually used for local processing of thin films. However, specifics of the polarizing films allow creating local modified areas with increased conductivity even with a maskless process. Thus, by investigating the structure of optically anisotropic films obtained from liquid crystal solutions of organic dyes, we have established that it has a certain degree of porosity, which allows performing electrochemical processes directly through the thickness of the film, utilizing the underlying electrode structure as one of electrodes in the electrochemical cell. The other electrode could be any chemically inert electrode, which would not contaminate the structure of the display. Electrochemical processing may make use of any existing electrolytes, including aqueous ones, which contain ions of the desirable materials. However, since it is important to preserve the structure of the film, solutions of electrolytes should be of low concentration and contain organic additives such as glycerin and others, allowing to weaken the electrolyte. Electrolytes with pH on the order of 8 are usually used. Besides that, the rate of electrochemical implantation should be rather slow, since a fast-rate electrolysis may help destroying the structure of the polarizer and lower its degree of anisotropy.

Figure 2:
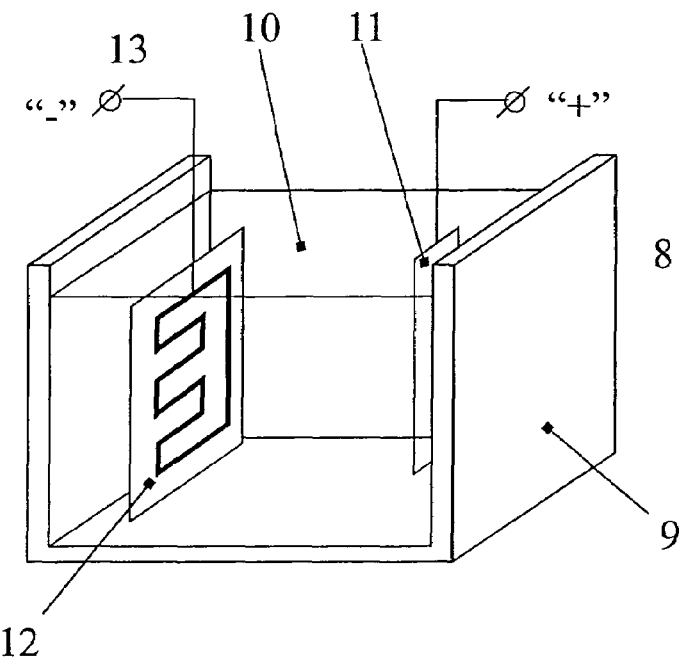
FIG. 2 is a diagram of an electrochemical cell.

FIG. 2 schematically illustrates electrochemical cell 8, where the cuvette 9 contains electrolyte 10, anode 11 and the work piece 12 (the plate of the display) with electrodes, which are connected to the circuitry of the cell and function as the cathode 13 and the layer of polarizer above the electrodes.

Besides that, the regions with increased conductivity in the film may be obtained via irradiation of the structure (the plate of the display with electrodes and the polarizer) with ions of the metal—Ni, Co, Cr, Pt, Mo, Ag and others. The thickness of the modified regions is controlled by the implanted ion dose, wavelength of radiation, duration and energy density of the heating impulse used for the subsequent thermal processing. Conditions of the process are controlled so as to avoid damaging the structure of the polarizer film and eliminate the influence of processing conditions on the degree of anisotropy of the film. Ion implantation can be performed in various configurations: with protective masks, templates. The plate may be placed on an additional electrode in the reactor, while supplying the required potential to that electrode. In this case that electrode is connected with the electrode network of the plate, which significantly accelerates implantation process allowing to achieve desired results with significantly lower process parameters.

As an example of embodiment consider the method of fabricating liquid crystal display of reflecting type with internal polarizers obtained from liquid crystal solution of organic dye—sulfonated indanthrone. The front panel of the display is fabricated on a glass plate by forming the network of indium-tin oxide electrodes via employing the regular methods of purifying and photolithography. After that, the inter-electrode spaces are planarized with silicon dioxide layer. The planarizing layer leaves electrodes exposed. Next, the obtained structure is covered with crystalline film of the polarizer with the method described above. Prior to electrochemical processing of the film, it is converted into the water-insoluble form, for example via processing it with solution containing ions of two- or three-valence metals. Then the structure is placed into solution of a weak electrolyte usually used for silvering. Concentration of silver ions in solution is usually chosen between 0.1–0.001 moles/liter. One may also use additives like glycerin, ethylenglycol or ethylenediamintetracetic acid. Electrodes on the plate are then connected to the cathode of the electrolysis cell. Another electrode with catalytic platinum coating is used as the anode. The process starts when voltage is applied to the electrodes, and it continues until the local modified regions with high conductivity in the polarizer film are obtained. Usually, the process of impregnation is performed in galvanostatic regime with current density below 0.01 mA/cm$^2$. However, it is also possible to use voltostatic or mixed regimes, as well as impulse regimes of electrochemical process. Finished plates are assembled to form the cavity. Liquid crystal is injected in between the plates, and the display is sealed. Measurements have showed that creating local regions with high conductivity in the film of the polarizer in the areas above the electrodes leads to significant decrease of energy consumption by the display, which allows significantly decrease its overall thickness.

Reference
1. L. K. Vistin. JVHO, 1983, vol. XXVII, ed.2, pp. 141–148.
2. U.S. Pat. No. 5,007,942, 1991.
3. RU 2120651, 1998.
4. U.S. Pat. No. 5,739,296, 1998.
5. U.S. Pat. No. 6,198,051, 2001.

The invention claimed is:

1. Liquid crystal display comprising a layer of liquid crystal, placed between two plates, on each of which there is a network of electrodes and at least one layer of polarizer, where electrodes on at least one of the plates are transparent, and at least one polarizer layer on the top of transparent electrodes relative to the plate is an E-type polarizer and made from at least partially crystalline anisotropic film of at least one organic dye, wherein the areas of at least one E-type polarizer above the transparent electrodes are modified such as to increase the electrods' conductivity.

2. Display according to claim 1, wherein the E-type polarizer has been fabricated using at least one organic material, chemical formula of which contains at least one ionogenic group, which provides its solubility in polar solvents in order to form lyotropic liquid crystal phase and at least one anti-ion.

3. Display according to any of the claim 1 or 2, wherein in the capacity of the organic material one uses at least one organic dye capable of absorbing in at least one of the following spectral ranges: from 200 to 400 nm, from 400 to 700 nm, from 0.7 to 13 µm.

4. Display according to claim 1 or 2, wherein the local areas of the E-type polarizer are modified via impregnation of ions of at least one material, which would provide an increase of conductivity of those local areas.

5. Display according to claim 4, wherein in the capacity of the material that increases conductivity of local areas of the polarizer one uses silver, and/or aluminum, and/or nickel, and/or other metal.

6. Display according to claim 1 or 2, wherein it additionally comprises at least one layer aligning the liquid crystal, and/or at least one diffuse-reflecting layer, and/or at least one phase-shifting layer, and/or at least one birefringent layer, and/or at least one conducting layer, and/or at least one protective layer, and/or at least one isotropic layer, and/or at least one insulating layer, and/or at least one planarizing layer, and/or one diffuse- or mirror-reflecting layer, and/or at least one layer simultaneously functioning as at least two of the said layers.

7. Display according to claim 1 or 2, wherein the layer of the E-type polarizer simultaneously functions as the phase-shifting layer, and/or birefringent layer, and/or layer that aligns the liquid crystal, and/or protective layer, and/or a layer simultaneously functioning as any combination of at least two of the said layers.

8. Display according to claim 1 or 2, wherein each of the transparent electrodes has auxiliary metallic structure, implemented on a part of the surface of electrodes to increase their conductivity.

9. Display according to claim 1 or 2, wherein optical thickness of layers in the display is chosen such as to provide interference extremum on at least one side of the display.

10. Method of fabricating liquid crystal display according to claim 1, which includes fabricating the plates of the display with electrodes and polarizers, joining the plates while forming a cavity for the liquid crystal via using spacers, filling the cavity with liquid crystal and sealing it, wherein on the surface of the transparent electrodes formed on the inner surface of at least one of the plates of the display, one forms at least one layer of E-type polarizer made out of at least partially crystalline optically anisotropic film of at least one organic dye, after which the local areas of the crystalline film above the electrodes are impregnated with ions of metals in the amount sufficient to increase conductivity of the film in those local areas.

11. Method according to claim 10, wherein impregnation of metal ions into the local areas of the polarizer film is performed via electrochemical processing of the display plate, with already applied transparent electrodes and polarizer film, in solution of an electrolyte containing ions of the implanting metal, where the transparent electrodes on the plate are used as the cathode, while as the anode—one uses electrode with catalytic, for example, platinum coating.

12. Method according to claim 10 or 11, wherein concentration of the solution of electrolyte and parameters of the electrochemical processing are chosen such as to perform implantation of metal atoms into the polarizer film without decreasing its degree of anisotropy.

13. Method according to claim 10 or 11, wherein in case of using aqueous solution of the electrolyte, before performing the electrochemical processing the polarizer film is processed to convert the material of the polarizer film into the water insoluble form.

14. Method according to claim 10, wherein impregnation of local areas of polarizer film is performed via ionic implantation, controlling the concentration of the implanting admixture by the dose of implantation, and the depth of penetration—by the energy and type of the implanting ions.

15. Method according to claim 14, wherein ionic impregnation is performed in the reactor with an additional electrode, on which the processing structure is mounted.

16. Method according to claim 10 or 14, wherein after fabricating the electrodes, the inter-electrode space is coated with a layer of dielectric such as to planarize the electrode structure.

17. Method according to claim 10 or 14, wherein the crystalline film of the E-type polarizer is formed via depositing liquid crystal solution of at least one organic dye with simultaneous and/or subsequent orienting influence, and removal of the solvent.

18. Method according to claim 10 or 14, wherein it additionally comprises formation of at least one layer aligning the liquid crystal, and/or at least one diffuse-reflecting layer, and/or at least one phase-shifting layer, and/or at least one birefringent layer, and/or at least one conducting layer, and/or at least one protective layer, and/or at least one isotropic and/or anisotropic layer, and/or at least one insulating layer, and/or at least one planarizing layer, and/or one diffuse or mirror-reflecting layer, and/or at least one layer simultaneously functioning as at least two of the said layers.

* * * * *